United States Patent [19]

Prittinen et al.

[11] Patent Number: 5,141,774
[45] Date of Patent: Aug. 25, 1992

[54] METHOD AND APPARATUS FOR COATING INTERNAL CAVITIES OF OBJECTS WITH FLUID

[76] Inventors: Michael W. Prittinen, 2 Woodland Shores, Bridgeman, Mich. 49108; Scott A. Hale, 939 Dearborn Cir., Carol Stream, Ill. 60188; Scott Bellinger, 210 E. Madison; Steve Nisbett, 914 N. President, both of Wheaton, Ill. 60187; Gary Mulder, 231 E. Maple St., Villa Park, Ill. 60181; Timothy Gaipa, 4037 Meadow La., St. Joseph, Mich. 49085

[21] Appl. No.: 297,420

[22] Filed: Jan. 13, 1989

Related U.S. Application Data

[63] Continuation-in-part of Ser. No. 143,804, Jan. 14, 1988, abandoned.

[51] Int. Cl.$^5$ .......................... B05D 7/22; B05D 1/02; B05B 3/02; B05B 12/02
[52] U.S. Cl. ..................... 427/236; 427/239; 427/240; 118/317; 118/697; 118/705; 118/DIG. 10
[58] Field of Search .............. 427/240, 236, 28, 239; 118/317, 323, DIG. 10, 622, 697, 705

[56] References Cited

U.S. PATENT DOCUMENTS

| | | | |
|---|---|---|---|
| 2,098,857 | 11/1937 | Buckingham | 118/317 |
| 2,189,783 | 2/1940 | Eberhart | 427/233 |
| 2,208,636 | 7/1940 | Johnson | 118/711 |
| 2,264,632 | 12/1941 | Gerlitzki | 118/710 |
| 2,455,129 | 11/1948 | Lepperhoff | 118/313 |
| 2,512,581 | 6/1950 | Palermo | 118/684 |
| 2,760,585 | 8/1956 | Bergeron | 166/243 |
| 2,877,480 | 3/1959 | Warren | 15/127 |
| 2,941,500 | 6/1960 | Adams | 118/408 |
| 3,044,441 | 7/1962 | Blakeslee | 118/317 |
| 3,120,346 | 2/1964 | Willhoite | 239/215 |
| 3,252,442 | 5/1966 | Hazlett | 118/685 |
| 3,294,139 | 12/1966 | Preziosi | 411/303 |
| 3,322,095 | 5/1967 | Gelbjerg-Hansen et al. | 118/682 |
| 3,383,257 | 5/1968 | James | 156/74 |
| 3,416,492 | 12/1968 | Greenleaf | 118/620 |
| 3,422,795 | 1/1969 | Smith | 118/308 |
| 3,516,385 | 6/1970 | Walling | 118/317 X |
| 3,532,072 | 10/1970 | Kiwiet | 118/301 |
| 3,601,291 | 8/1971 | Tessmer | 222/519 |
| 3,605,827 | 9/1971 | Risser | 141/39 |
| 3,640,758 | 2/1972 | Hogstrom et al. | 118/55 X |
| 3,797,455 | 3/1974 | Scheffer et al. | 118/308 |
| 3,811,408 | 5/1974 | Thompson | 118/73 |
| 3,817,210 | 6/1974 | Greever | 118/408 |
| 3,830,902 | 8/1974 | Barnes | 264/267 |
| 3,889,628 | 6/1975 | Usab | 118/306 X |
| 3,894,509 | 7/1975 | Duffy et al. | 118/50 |
| 3,896,760 | 7/1975 | Duffy | 118/308 |
| 3,956,533 | 5/1976 | Weber et al. | 427/236 |
| 3,974,306 | 8/1976 | Inamura et al. | 427/183 |
| 3,995,074 | 11/1976 | Duffy et al. | 427/181 |
| 4,043,295 | 8/1977 | Speck et al. | 118/317 |
| 4,054,688 | 10/1977 | Duffy et al. | 427/183 |
| 4,060,868 | 12/1977 | Axvig et al. | 118/317 X |
| 4,114,505 | 9/1978 | Loeser et al. | 427/409 X |
| 4,233,932 | 11/1980 | Blakeslee | 118/306 |
| 4,279,943 | 7/1981 | Wallace | 427/57 |
| 4,321,885 | 3/1982 | Wallace | 118/102 |
| 4,372,245 | 2/1983 | Watson et al. | 118/56 |
| 4,429,658 | 2/1984 | Jones | 118/711 |
| 4,528,938 | 7/1985 | Neville | 118/711 |
| 4,652,468 | 3/1987 | Gould et al. | 427/236 X |

FOREIGN PATENT DOCUMENTS

383053 5/1987 Austria.

*Primary Examiner*—Evan Lawrence
*Attorney, Agent, or Firm*—Barnes & Thornburg

[57] ABSTRACT

The present invention discloses an apparatus and process for coating hollow objects at precise bands within the internal cavity of the object. The process utilizes centrifugal force to apply the fluid to the object. A probe is moved from underneath the object thereby utilizing gravitational forces to prevent spillage of the material from the probe. A computer controls the pumping rate, the vertical movement of the probe and the rotational speed of the probe to allow the machine to precisely coat a band on the internal cavity of an article. The computer controlled operation eliminates the necessity to waste material. One application of the invention is in the coating of the threads of nuts with Teflon.

32 Claims, 4 Drawing Sheets

METHOD AND APPARATUS FOR COATING INTERNAL CAVITIES OF OBJECTS WITH FLUID

This application is a continuation in part of copending U. S. patent application Ser. No. 07/143,804, filed Jan. 14, 1988 now abandoned.

BACKGROUND AND SUMMARY

This invention relates generally to improvements in fluid dispersing apparatus and methods of applying fluids to precise locations of hollow objects utilizing centrifugal force. One application of the invention is the application of liquid to the internal threads of a fastener nut.

Various coatings of fluid materials are applied to the internal surfaces of hollow objects such as nut type fasteners by a variety of coating systems. For example, "Teflon" (trademark of E. I. DuPont de Nemours & Co.) sealant is applied to the threads of nuts in order to provide an improved seal. The presence of the Teflon compound interferes with subsequent plating or surface coating if the Teflon is leaked onto the exterior surfaces.

For example, Teflon coated fasteners are used extensively in the automotive industry where steel parts are commonly immersed and coated with an electrodeposited rust inhibitor. A Teflon coating prevents the rust inhibitor solution from adhering to selected surfaces where the rust inhibitor layer may interfere with subsequent assembly requirements. For example, it is often desirable to maintain internal threads of fasteners free of the rust inhibitor to provide more reliable fit-up and assembly. Fasteners which have a Teflon coating on their internal threads can be immersed into a rust inhibitor bath along with an entire automotive assembly while maintaining selected surfaces where the rust inhibitor will not adhere. This is accomplished without the use of previous labor intensive, and often ineffective rubber plugs. In subsequent assembly, the Teflon coating readily yields to the insertion of a mating external thread.

The process of the present invention teaches coating on a repetitive part basis to pre-selected surfaces, such as the threaded cavities of nuts, and avoids contamination of adjacent and exterior surfaces. The apparatus for practicing the described process uses substantially all of the material to coat the nut, thereby eliminating waste.

U.S. Pat. No. 4,652,468 to Gould, et al. discloses a process for high pressure impact coating of portions of work pieces such as threaded openings and fasteners and avoidance of contaminating portions of the work piece with the coating material. The process requires masking of the surfaces of the nut in order to restrict material from contaminating the outer surfaces of the nut. Additionally, the machine requires a choked area for sucking the waste material from the fastener. Illustrated preferred embodiments of the present invention provide a precise amount of material to selected surfaces of the nut and eliminates the need to suck waste material from the nut.

U.S. Pat. No. 4,528,938 to Nevel discloses a rotary work piece treating apparatus for depositing coating or adhesive materials within threaded fastener nuts. The device includes a continuously rotating turntable assembly having a plurality of work station cylinders attached thereto. A probe attached to the plunger is caused to enter within the internal bore of the nuts and release flowable material within the nut. The flow of such material is controlled by a valve stem protruding from the probe which is depressed against the stop surface when the probe is inserted within the nuts. Certain preferred embodiments of the present invention utilize straight line feeding and eliminates the valve stem control for the material.

Other prior art such as U.S. Pat. Nos. 4,060,868 to Axvig and 3,896,760 to R. J. Duffy disclose systems and methods for coating the interior surfaces of pipes using a low pressure application of dry resin material to the interior of heated pipe sections. These disclosures do not address the problem of controlling the flow of liquid material to a selected surface with precise isolation from portions not to be coated with the liquid material.

Accordingly, it is an object of the present invention to provide an improved method and apparatus for applying a precise liquid coating to predetermined selected surfaces of hollow objects utilizing centrifugal force to disperse a metered quantity of fluid material.

It is another object of the present invention to rapidly apply fluid coatings to objects utilizing centrifugal force from the rotation of a probe inserted into the hollow cavity of an object.

It is another object of the invention to provide a process and apparatus which will eliminate waste material, thereby reducing material costs and ultimately disposal costs for the waste material.

It is another object of the invention to provide an apparatus and process for coating objects which will reduce production and maintenance labor.

It is another object of the invention to provide an apparatus and process which will eliminate utility costs, particularly the volume of air needed in the coating process.

It is another object of the invention to provide a process and apparatus which eliminates the need for sealing and/or masking of the object to be coated.

It is another object of the invention to provide a process and apparatus which can control the coating process by calculating the metered pumping rate, and the up and down cycle of the probe.

It is another object of the invention to provide an apparatus and system which applies a uniform coating to a precise portion of the object to be coated.

It is another object of the invention to provide a system which recirculates the coating material thereby restricting settlement problems in the material.

It is another object of the invention to provide a machine which reduces noise, spillage, and other problems in the work place.

It is another object of the invention to eliminate high pressure delivery lines for coating objects.

Additional benefits and advantages of the present invention will become apparent to those skilled in the art to which this invention relates from the subsequent description of the preferred embodiments in the appended claims, taken in conjunction with the accompanying drawings.

The above objects are accomplished with the apparatus and process for coating hollow objects with fluid materials according to this invention. The apparatus and process described herein utilizes centrifugal force to disperse fluid from a probe. The apparatus meters a precise amount of fluid thereby eliminating waste of excess material and the need to mask the article. Preferred embodiments of the present invention incorporate a conveying device for moving a succession of workpieces, for example, internally threaded articles, into position for application of fluid. In certain preferred embodiments, a rotating hollow probe is then moved from under the object into a coating position. Preferably, the probe is simultaneously moved upward through the workpiece coating the object as the material is pumped from a holding chamber through the metering pump, thereby metering the volume of fluid, and dispersed by the centrifugal force from the rotary motion of the probe. In certain preferred embodiments, when the selected area has been coated, the pump is reversed to pull the material away from the opening in the probe and the probe is then withdrawn from the object. In preferred embodiments, the probe dispenses a second coating during the removal from the object. The object is then preferably moved into a drying chamber where the excess vapors are drawn off from the object. The process minimizes any waste material thus improving the environmental aspects of the work place.

DETAILED DESCRIPTION OF THE INVENTION

Figure 1:
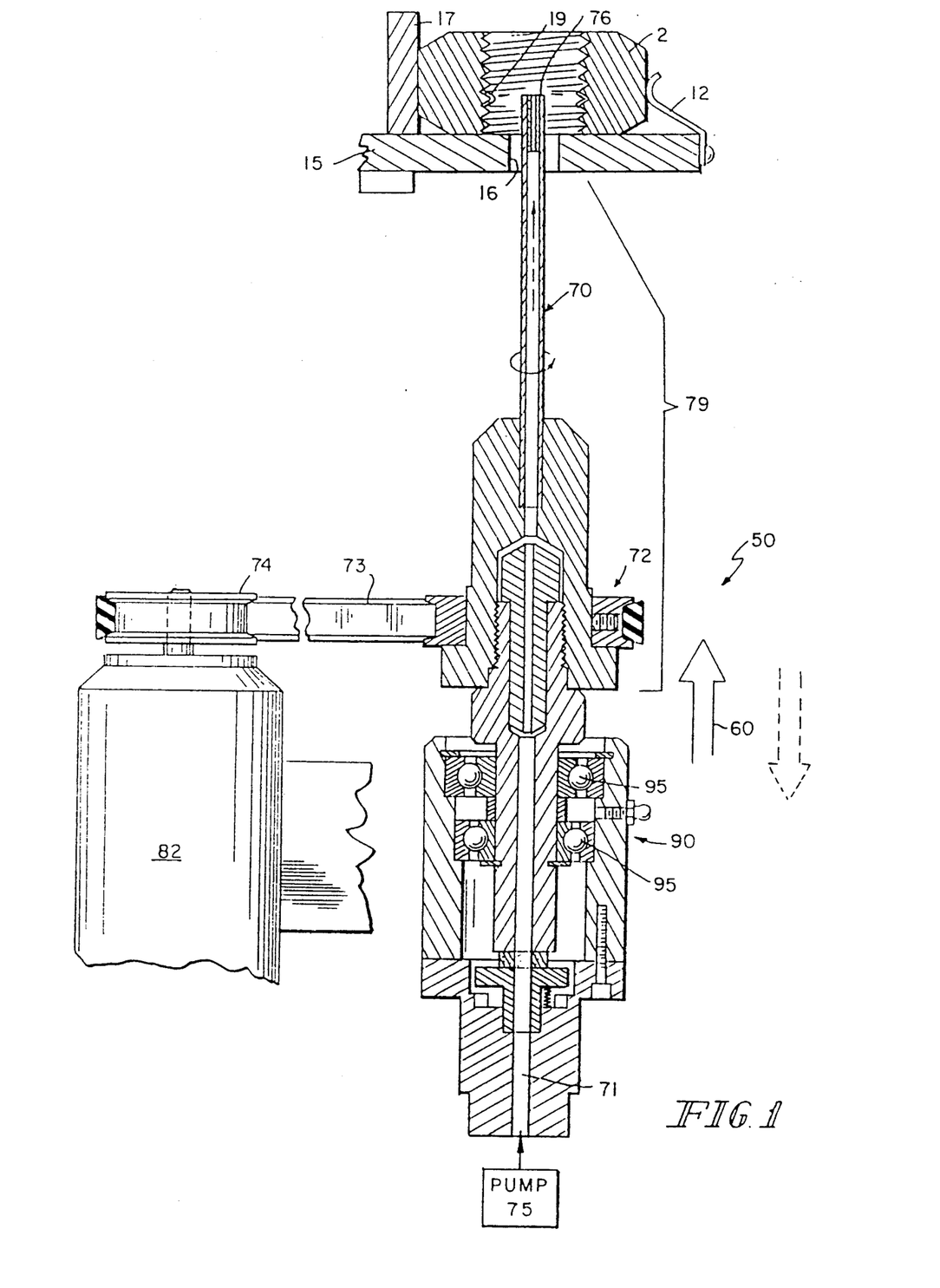
FIG. 1 is a fragmentary sectional view of the apparatus used in the process of coating the objects with fluid.

In FIG. 1, fastener nuts 2 are being coated with a material such as Teflon fluid material. The nut is delivered to the coating position by a straight line feeding means. One embodiment uses a support track moving the nuts to the coating position. The nuts are loaded onto the feeding means by a rotary bowl feeder. Any conventional object feeding means is appropriate.

Spring detent 12 holds a nut 2 in position for coating. Arrow 60 designates any conventional plunger means to move the rotary probe 70 into the internal cavity of the nut. In a preferred embodiment a lead screw drive means (not shown, but designated by arrow 60) moves the probe 70, motor 82, and the supporting brackets uniformly upward so that the probe is inside the cavity of the object to be coated. Since probe unit 79 is driven by belt 73 the entire unit 80 must be moved so that the probe 70 is within the cavity of the object to be coated. Lead screw drive means is one example used as a plunger means 60. Any type of vertical drive means 60 could be used or alternatively only probe 70 could be moved into the cavity of the nut if a different apparatus is used to rotate probe 70.

A portion of table 15 is shown with opening 16 in a bottom section. Table 15 includes side support 17 which works in conjunction with spring detent 12 to hold nut 2 in position. Table 15 can also support the feeding means, drying means, plunger means 60, and computer 50.

Figure 3:
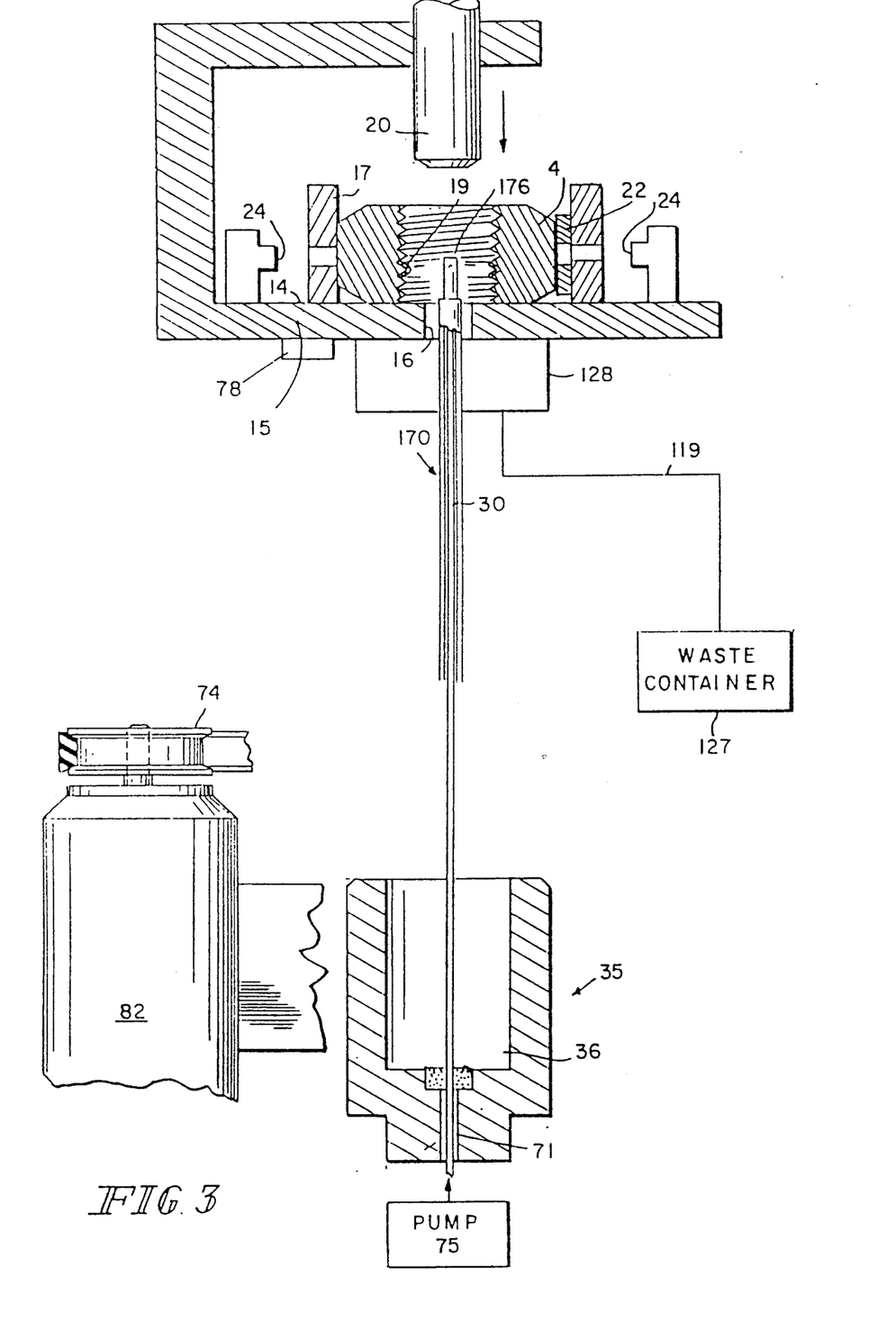
FIG. 3 is a fragmentary sectional view of another preferred embodiment of the apparatus used in the process of coating the objects with fluid.

Referring to FIG. 3, in another preferred embodiment of the present present invention, conventional microlab metering pump 75 is utilized to provide precise control over the volume of fluid introduced into rotary probe 170. A relatively narrow hollow stainless steel tube 30, on the order of 0.083 inches in outside diameter and 0.062 inches in inside diameter, is connected to the fluid supply through pump 75. Top end 32 of tube 30 is preferably positioned in hollow cavity 180 of probe 170 up to a distance approximately 0.032 inches below opening 176 in rotary probe 170. The small diameter of tube 30 provides better control of fluid presentation to rotary probe 170 and minimizes the volume of fluid necessary to prefill the system.

In the embodiment shown in FIG. 3, clamp 100 fixedly secures probe 170 to housing assembly 102. A pair of conventional bearings 95, driven by belt 73, provides rotation of probe 170 and housing assembly 102. Tube 30 is connected to pump 75 and therefore does not rotate. Second housing 35 is fixedly attached to tube 30 and includes cavity 36 for capturing fluid and solvent which runs downwardly into the space caused by clearance between tube 30 and internal cavity 80 of probe 170.

Figure 4:
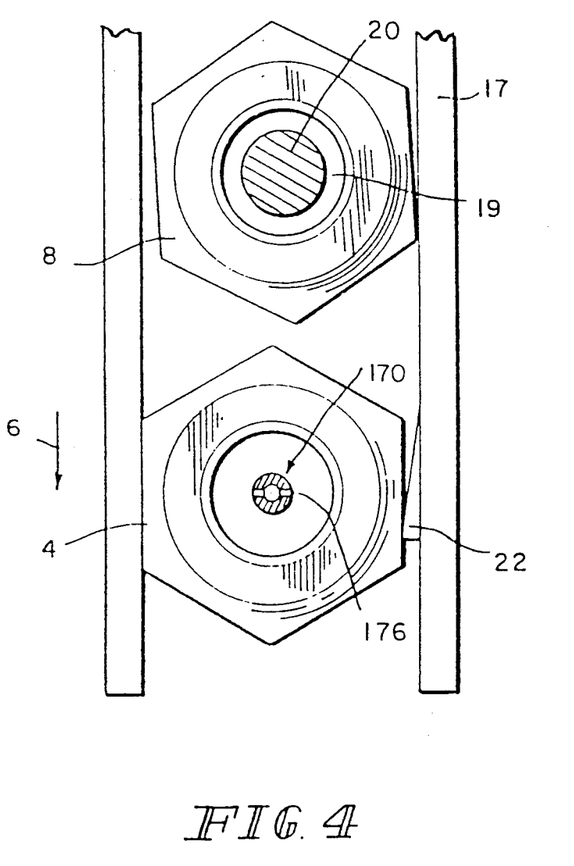
FIG. 4 is a top view of the embodiment shown in FIG. 3.

Referring to FIG. 4, a slidably mounted presentation pin 20 is positioned over internal cavity 19 of fastener 8 and moves vertically downwardly into internal cavity 19 of the next fastener 8 to be coated. Once inserted, the presentation pin 20 moves fastener 8 horizontally along direction 6 and positions the fastener 8 into the position of fastener 4 centered over rotary probe 170. Positioning spring 22 engages fastener 4 securely against side support 17 to position internal cavity 19 of fastener 4 in the proper position for the coating process. The width between side support 17 and positioning spring 22 is transversely adjustable to accommodate fasteners 4 with different outside diameters while maintaining alignment between internal cavity 19 of fastener 4 and probe 170.

Figure 5:
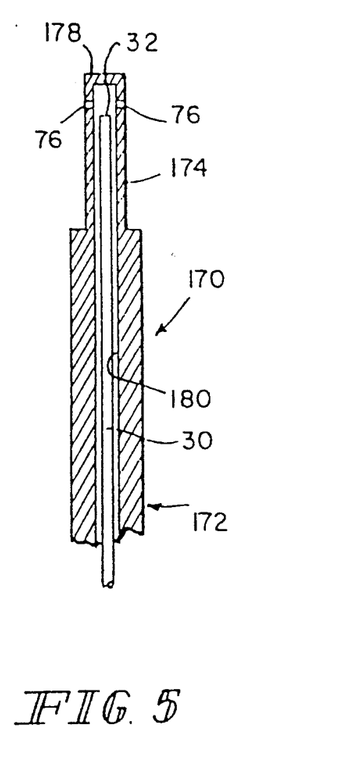
FIG. 5 is a cross-sectional view of the rotary probe in the embodiment shown in FIG. 3.

Referring to FIG. 5, rotary probe 170 is shown. Probe 170 preferably has shaft section 172 which transitions into tip section 174 of smaller diameter than shaft section 172. Preferably, at least one opening 176 is provided in the vertical portion of tip section 174 to allow for centrifical dispersion of the fluid therethrough. Although it is not necessary for the non-pressurized fluid coating system of the present invention, cap 178 preferably encloses the top of probe 170. Tube 30 enters into hollow cavity 180 of probe 170 and transfers fluid into a position for centrifugal dispersion through opening 176. In a preferred embodiment, two 0.20 inch diameter openings 176 are utilized in probe 170. Shaft section 172 with an outside diameter of approximately 0.125 inch and tip section 174 with an outside diameter ranging from 0.070 inch through 0.125 inch has proven to be effective in coating internal cavity 19 of fasteners 4 with inside diameters ranging from approximately 0.125 inch to 0.500 inch.

In the preferred embodiment shown in FIG. 3, tube 30 is prefilled with fluid pumped from metering pump 75. Once the capacity of tube 30 is exceeded, the excess fluid runs out opening 176 and proceeds into purging chamber 128. This initial overflow of fluid permits air and other impurities which may be present in the fluid remaining in tube 30 to be replaced with clean fluid drawn from Teflon tank 85.

During the solvent cleaning cycle, selector valve 118 is reset to draw solvent from solvent tank 125 into tube 30. Again, once the drawn solvent exceeds the capacity of tube 30, the excess solvent runs out opening 176 and proceeds into purging chamber 128. The fluid and solvent in purging chamber 128 is transferred through line 119 into waste container 127. Once the solvent purge cycle is completed, selector valve 118 is again reset to draw from Teflon tank 85 and Teflon fluid is again prefilled into tube 30 as described above. Once this Teflon fluid prefill cycle is complete, the system is again ready to apply Teflon fluid coating to internal cavity 19 of fastener 4.

In certain preferred embodiments, stepping motor 82 is programmable through digital computer 50 to control the rate and extent of vertical travel of rotary probe 170. Preferably, once fastener 4 is in the proper position to initiate the coating process, stepping motor 82 moves rotary probe 170 fairly rapidly to a position immediately below the top surface 14 of table 15. At this point, the vertical travel is momentarily stopped. During the momentary stoppage, metering pump 75, controlled by digital computer 50, begins to pump fluid through tube 30. Rotary probe 170 then continues vertically upwardly at a pre-selected coating travel speed through internal cavity 19. Once the coating operation has been completed, rotary probe 170 can be withdrawn from internal cavity 19 fairly rapidly to a position below the top surface 14 of table 15 to allow the next fastener 8 to be positioned for coating.

In most applications, rotation of probe 170 at a rate of approximately 10,000 revolutions per minute has proven effective in providing sufficient centrifical force to disperse Teflon fluid from probe 170 onto the selected portions of internal cavity 19. The optimum revolution rate varies somewhat with the viscosity of the fluid being dispersed. For example, a slight increase in rotation can often be effective when dispersing fluids with higher viscosities.

In certain preferred embodiments, metering pump 75 may be initiated when opening 176 in rotary probe 170 is positioned at any pre-selected vertical position below or above top 14 of table 15 in interior cavity 19 of fastener 4. Therefore, the position of initiating fluid flow can be input via digital computer 50 to begin below top 14 of table 15 prior to opening 176 entering internal cavity 19, to ensure complete thread coverage. Alternatively, the coating can begin at any pre-selected level above top 14 of table 15 in internal cavity 19 of fastener 4 for coating of only selected portions of the length of internal cavity 19.

In certain preferred embodiments, rotary probe 170 spins continuously, and the dispersion of fluid is controlled by metering pump 75 pumping fluid above the level of opening 176 in rotary probe 170. The total volume of fluid dispersed can be pre-selected by entering the number of steps of metering pump 75 via digital computer 50. To discontinue coating, metering pump 75 is stopped and no further fluid is present at opening 176. Therefore, no further fluid dispersement occurs. In most applications, the volume of fluid dispersed is selected to provide a Teflon coating of approximately 0.001 inch on those surfaces to be coated. By control of metering pump 75 and vertical coating travel speed by digital computer 50, a uniform coating of Teflon is achieved, even on uneven surfaces such as threads. By programming digital computer 50 and control of metering pump 75, internal cavity 19 of fasteners 4 can be completely coated or alternatively only preselected portions of the length of internal cavity 19 may be coated.

Simultaneously a digital computer 50 controls the movement of the nut positioning means (not shown), the vertical plunger means 60, (illustrated by the arrows), and the pump 75 providing fluid.

When the apparatus is activated, unit 80 is programmed to automatically move into a position until probe 70 contacts a photo electric sensor 78 located near table 15. The computer 50 is then programmed to define the position where probe 70 begins coating a nut 2.

In preferred embodiments, photosensitive electric eye 24 verifies that fastener 4 is in the proper position for coating before allowing probe 170 to enter internal cavity 19 of fastener 4. If fastener 4 is not positioned in a suitable position for coating, digital computer 50 will prevent rotary probe 170 from dispersing fluid. This prevents inadvertent dispersion of fluid when internal cavity 19 of fastener 4 is not in the proper position for coating. A counter mechanism (not shown) may also be included to track the number of fasteners 4 coated.

Unit 80 includes replaceable unit 79 made up of probe 70 and pulley section 79. This portion of the machine is easily disconnectable in order to provide a different tip for different types of fluids to coat different objects. The pulley diameter is constructed for the specific type of fluid to be dispersed. This provides an easy control for the operator to change from one fluid to another.

Figure 2:
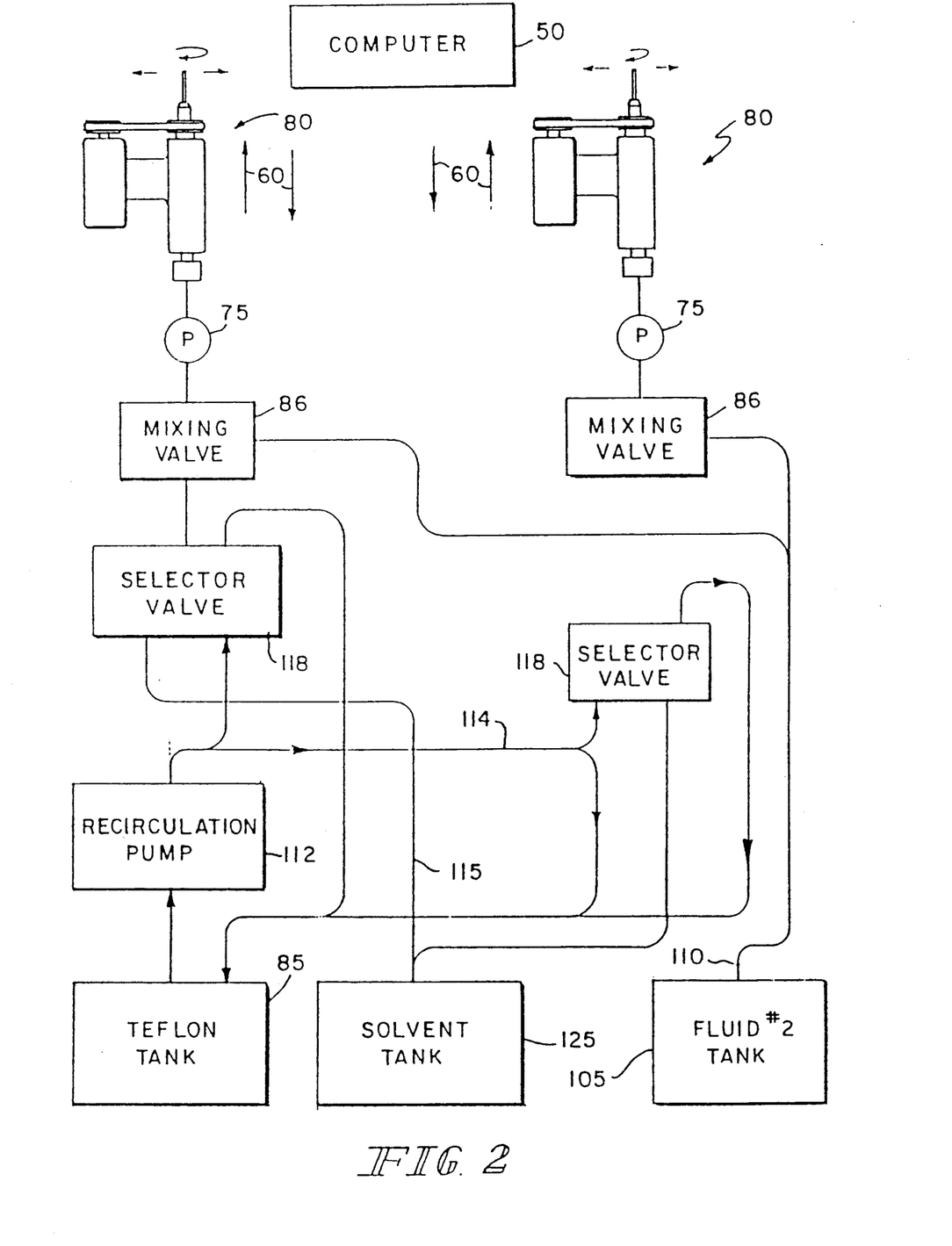
FIG. 2 is a diagrammatic view of the coating apparatus.

The pulley 72 is connected via a belt 73 to a pulley 74 connected to a motor 82. The speed of the motor 82 can be controlled by the computer 50. In a preferred embodiment, the probe is continually rotating while the apparatus is operating. A recirculating pump 112 pumps well stirred fluid from Teflon tank 85 continuously through supply line 114 in order to keep the coating fluid from possible segregation When pump 75 is connected to supply line 114, fluid moves through selector 118, into mixing valve 86., then through positive displacement metering pump 75. A metered amount of fluid is delivered through delivery tube 71 in rotary union 90 to rotating probe 70. Rotary union 90 allows probe 70 to turn during the delivery of fluid Conventional bearings 95 are shown at a suggested location in rotary union 90.

As seen in FIG. 2, a separate additional fluid in fluid #2 tank 105 can be introduced into mixing valve 86 through line 110 by conventional valving means when a two component fluid mixture is desired. Computer 50 controls valve 86 for such a mixture Computer 50 controls the metering pump rate, the distance and speed of the plunger means 60, and the operation of the selector valve 118.

The pump 75 moves fluid into the probe 70. The pump does not disperse the fluid out of opening 76. The fluid is dispersed by the centrifugal force of the probe rotating In other words pump 75 simply positions fluid to a level from which the rotation of the probe forces the fluid out the openings. In preferred embodiments rotating the probe at speeds between 10,000 and 15,000 revolutions per minute have been particularly effective to utilize centrifugal force to disperse the fluid.

Computer 50 can be programmed to coat the material while traveling upward through the nut and then recoat the nut during removal from the nut. The use of the probe and location of the opening provides the nut to be coated in precise bands within the internal cavity 19. For example, the coating can start at 2 centimeters from the bottom of the nut and end 4 centimeters form the top of the nut by programming the computer for this band of coating.

When the coating operation is one coat in only one direction, preferred embodiments use a reversible pump to pump material back to supply chamber 85. When pump 75 is reverse it pulls material back into the supply chamber and allows the probe to continue spinning without dispersing fluid. The probe would stop dispersing fluid without reversing the pump. However, the reversing of the pump pulls material away from the discharge opening to ensure material will not be inadvertently dispensed.

Diagramatic view 2 illustrates the use of Teflon material in a system utilizing two coating machines controlled by one computer. Recirculating pump 112 is connected to a supply of fluid 85, for example, Teflon. This recirculation of fluid mixes the material and restricts settlement of components from the mixture Selector valve 118, controlled by computer 50, is open to either supply line 114 allowing Teflon from tank 85 or line 115 allowing solvent from tank 125 into the mixing valve 86. Teflon is selected for coating the nut. Solvent is selected for purging of the system prior to a process shutdown for a variety of reasons including but not limited to maintenance or changing to a different nut size. To ensure consistent, high quality coating, the solvent purge cycle should preferably be utilized at least once during each four hour period in which the equipment is operated Computer 50 is a programmable computer allowing the operator to provide pumping speed rates of material to be pumped and the location of the probe within the article to be coated. It may be appreciated that the operator can easily program the computer while observing the coating operation. The speed of vertical travel of plunger means 60 can be controlled to provide for different viscosities of fluids and the desired thickness of the coating. Stepping or servo motors can be connected to the motor 82 in order to provide precise control of the operation.

FIG. 1 shows the fluid chamber 71 leading to the probe 70. In this preferred embodiment, the opening 76 for the dispersion of material is on or near the top of the probe 70 It can be appreciated that as the probe rotates, the coating material will be discharged from the top of the probe. The material in the probe forms a parabolic configuration. If the material is not near the upper portion of the probe, the material will not be discharged from the opening 76

A conventional vapor discharge means (not shown) is provided after the nut has received the coating fluid and moved through a drying chamber (not shown). The drying chamber can use heated air forced through a closed chamber by a fan.

In another preferred embodiment, a drying track (not shown) is utilized to ensure that the Teflon coating is dry before fasteners 4 are dropped into a storage or shipping container (not shown). Preferably, a drying track containing forced air heated to approximately 120° F. is used with a track length sufficiently long to ensure complete drying of the Teflon coating before the fasteners reach the end of the line. It should be recognized that the temperature and length of the drying track may be readily adjusted to accommodate fluids with different drying characteristics.

Preferred embodiments of the present invention reduce the waste material A preferred embodiment provides a purging chamber 128 whereby the material in the system ca be shut off at valve 118 and the material left can be discharged into a waste container 127. The solvent remains in fluid chamber 71 until a pre-filling operation forces the solvent into purging chamber 128 and fills fluid chamber 71 with Teflon. The waste material flows from purging chamber 128 through line 119 into waste container 127.

Certain preferred embodiments of the present invention utilize one computer 50 to control two production lines. The computer is programmable to provide one coating application on one head and a distinct coating application on the other head. Several "lines" could be controlled by one computer. The use of the computer allows precise bands of fluid to be dispersed within the hollow object.

Preferred embodiments of the present invention may be used to coat objects with any flowable material. For example, an extremely fine flowable Teflon material is contemplated for use with this invention. Also, a material such as microencapulated epoxy such as that sold under the trademark Scotchgrip by Minnesota Mining & Manufacturing Co. or microencapulated anarobic epoxy such as that marketed by Loctite Corporation may be readily applied to the internal cavities of fasteners using this invention Also, fluid weld spatter repellant may be applied to selected internal cavities using this invention. Preferred embodiments of the present invention are also capable of coating non-circular internal cavities in fasteners without any change in the equipment set-up.

While the above description constitutes the preferred embodiments of the present invention, it will be appreciated that the invention is susceptible to modification, variation and change without departing from the proper scope and fair meaning of the accompanying claims.

What is claimed is:

1. A process for selectively coating surfaces of a hollow object with fluid in a preselected pattern comprising the steps of:

placing an object to be coated at a predetermined location;

moving a hollow probe with at least one opening from below the object into a position for initiating coating the object;

simultaneously pumping material from a holding chamber into the probe, rotating the probe at a predetermined speed and advancing said probe vertically through said object a predetermined length to deposit said preselected pattern in said object using centrifugal force from the rotary motion of the probe to disperse the fluid through said at least one opening in the probe.

pumping a predetermined amount of said fluid out of said probe thereby stopping the coating process;

withdrawing said probe from said object; and removing said object form said predetermined location.

2. The process of claim 1 further including moving said coated objects through a drying chamber.

3. The process of claim 1 wherein said probe is continually rotating during said coating process.

4. The process of claim 1 wherein a computer simultaneously controls a pump for providing material to said probe and the rotational speed of said probe to allow for a variety of coating materials.

5. The process of claim 1 wherein said probe rotates between 10,000 and 15,000 revolutions per minute.

6. A process for selectively coating objects having internal cavities with a fluid in a pattern comprising:

moving a succession of said objects into a position for application of said fluid;

moving a hollow probe applicator with at least one opening into a position for coating from a position below said object;

spinning said applicator continually;

pumping fluid from at least one holding chamber when said applicator reaches said coating position;

continuing moving said applicator upward through said object a predetermined distance;

simultaneously stopping the upward movement of said applicator while reversing said pumping to pull fluid away from said at least one opening in said applicator; and removing said applicator from said object.

7. A process for selectively coating an internal surface of an object with fluid, comprising the sequential steps of:

placing said object to be coated at a predetermined location using a presentation pin;

securing said object at said predetermined location by holding said object between a positioning spring and a side support;

moving a probe with a hollow cavity and at least one opening from said cavity vertically upward at a first predetermined speed from a position below said object into a first preselected position in said internal surface of said object where the coating operation is to commence;

rotating said probe at a predetermined rotational speed about a longitudinal axis of said probe;

momentarily stopping vertical movement of said probe at said first preselected position;

continuing vertical movement of said rotating probe upwardly at a second predetermined coating travel speed from said first preselected position where the coating operation is to commence to a second preselected position where the coating operation is to end, while simultaneously pumping said fluid from a fluid holding chamber into said hollow cavity of said probe thereby substantially filling said hollow cavity of said probe below said opening in said probe and thus positioning said fluid adjacent said opening in said probe for centrifugal dispersion of said fluid through said opening in said probe onto said internal cavity of said object;

discontinuing pumping said fluid;

withdrawing said probe from said second preselected position to said position below said object; and removing said object from said predetermined location.

8. The process of claim 7, wherein:

said centrifugal coating of said internal cavity of said object continues during said withdrawal of said probe from said second preselected position to said first preselected position; and said centrifugal coating of said internal surface of said object discontinues when said downward movement of said probe reaches said first preselected position in said internal cavity of said object.

9. The process of claim 8, wherein said internal surface has internal threads and said object is a fastener.

10. The process of claim 7, wherein said internal surface has internal threads and said object is a fastener.

11. A process for coating surfaces of a hollow object with fluid in a preselected pattern comprising the steps of:

placing said object to be coated at a predetermined location;

moving a hollow probe with at least one opening from below said object into a position for initiating coating of said object;

simultaneously pumping material from a holding chamber into said probe, rotating said probe at a predetermined speed and advancing said probe vertically through said object a predetermined length to deposit said preselected pattern in said object using centrifugal force from said rotary motion of said probe to disperse said fluid through said at least one opening in said probe while traveling in a first direction through said object;

simultaneously pumping material from a holding chamber into said probe, rotating said probe at a predetermined speed and withdrawing said probe vertically through said object using centrifugal force from said rotary motion of said probe to disperse said fluid through said at least one opening in said probe while traveling in a second direction opposite to said first direction;

withdrawing said probe from said object; and removing said object from said predetermined location.

12. The process of claim 11 further including moving said coated object through a drying chamber after removing said object from said predetermined location.

13. The process of claim 11, wherein said probe is continually rotated during said coating process.

14. The process of claim 11, wherein a computer simultaneously controls a pump for providing said fluid to said probe and the rotational speed of said probe to allow for a variety of coating materials.

15. The process of claim 11, wherein said probe rotates between 10,000 and 15,000 revolutions per minute.

16. The process of claim 11, wherein said probe has a substantially cylindrical, smooth outside surfaces and said probe is removable and replaceable in a housing.

17. The process of claim 11, wherein said hollow object is an internally threaded fastener.

18. An apparatus for applying fluid material within an internal cavity of an object comprising:

a support track;

a rotary bowl feeder for loading said object onto said support track;

a locating means for positioning said object in a predetermined position on said support track prior to coating said subject with said fluid material;

a hollow probe including at least one opening for dispensing said fluid material within said internal cavity of said object;

rotation drive means for rotating said probe;

a supply container for said fluid material;

a reversible pump for pumping said fluid material from said supply container into said probe;

plunger means for moving said probe into said internal cavity of said object;

control means for coordinating said rotational drive means, said pumping means, and said plunger means thereby coating said object in a predetermined manner, utilizing centrifugal force to disperse said fluid material from said at least one opening in said probe; and wherein said reversible pump draws said fluid material from said probe upon reaching a predetermined location to stop dispersion of said fluid material from said probe.

19. The apparatus of claim 18 wherein a drying means drys said coated object after said probe is removed from said object.

20. The apparatus of claim 19 wherein said drying means includes heated force air introduced into a closed chamber at one location; and a vacuum means pulling the air out at a second location.

21. The apparatus of claim 18 wherein a purge means for cleaning said fluid material from said apparatus is connected to a discharge container.

22. Apparatus for coating selected internal cavities of an object with fluid, comprising:

positioning apparatus means for positioning an internal cavity of said object to be coated at a predetermined location;

probe means having a hollow cavity and at least one opening;

wherein said probe means is substantially cylindrical and said opening in said probe is positioned in a tip section of said probe means which has a smaller outside diameter than a shaft portion of said probe means;

rotation drive means for rotating said probe means;

a supply container for said fluid;

pumping means for pumping said fluid from said supply container into said hollow cavity of said probe means;

movement means for moving said probe means from a first position within said internal cavity of said object;

control means for coordinating said rotation drive means, said pumping means, and said movement means thereby coating said object in a predetermined manner, using centrifugal force to disperse said fluid through said opening in said probe means; and said control means includes means for controlling the coating operation to selectively coat only a portion of the length of said internal cavity of said object.

23. The apparatus of claim 22, wherein said control means includes a digital computer for coordinating said rotation means, said pumping means and said movement means thereby providing a uniform coating thickness.

24. The apparatus of claim 23, wherein said movement means provides substantially vertical movement of said probe means;

said rotation drive means continually rotates said probe means and the centrifugal dispersion of fluid is controlled by said pumping means introducing said fluid to a level in said hollow cavity in said probe means adjoining said opening in said probe means for dispersion therethrough; and said centrifugal dispersion of fluid is ceased by said pumping means discontinuing its pumping of said fluid to said hollow cavity of said probe means.

25. An apparatus for applying fluid to internal cavities of a fastener or similar article, comprising:

positioning device for locating said fastener at a predetermined location;

probe having a hollow cavity and at least one opening from said cavity;

wherein said probe has a substantially cylindrical cross section and includes a shaft portion which transitions into a tip portion and said opening is positioned in said tip portion which has a smaller outside diameter than the outside diameter of said shaft portion of said probe;

drive motor for continuously rotating said probe;

fluid supply chamber;

metering pump for pumping said fluid from said fluid supply chamber to said hollow cavity in said probe to a level in said hollow cavity of said probe adjoining said opening in said probe for dispersion therethrough;

stepping motor for moving said probe from an initial position below the bottom surface of said fastener vertically upward through said internal cavity of said fastener;

digital computer control for coordinating said drive motor, said metering pump and said stepping motor to coat said internal cavity by centrifugal dispersion of said fluid through said opening in said probe;

wherein said digital computer control includes means for controlling the operation to selectively coat only a portion of the length of said internal cavity of said fastener; and said centrifugal dispersion of said fluid is ceased by said metering pump discontinuing its pumping of said fluid into said hollow cavity of said probe.

26. The apparatus of claim 25, wherein said probe has a substantially smooth outside surface and said probe is removable and replaceable in a housing assembly and said housing assembly and said probe are rotated together by said drive motor.

27. The apparatus of claim 26, further including a hollow tube positioned in said hollow cavity of said probe which transports said fluid pumped by said metering pump to a location below said opening in said probe.

28. The apparatus of claim 27, wherein said hollow tube remains stationary while said probe continually rotates thereabout, causing circumferential dispersion of fluid pumped through said hollow tube by said metering pump through said opening in said probe.

29. The apparatus of claim 28, further including a purge means for periodically cleaning said fluid from said apparatus; and a drying means for drying said coated object including a closed chamber into which heated forced air is introduced in order to decrease the time required to dry said fluid after said coating operation is complete.

30. The apparatus of claim 25 further including:

a purge means for periodically cleaning said fluid from said apparatus; and a drying means for drying said coated objects including a closed chamber into which heated forced air is introduced in order to decrease the time required to dry said fluid after said coating operation is complete.

31. The apparatus of claim 29, wherein said internal cavity of said fastener is threaded.

32. The apparatus of claim 25, wherein said internal cavity of said fastener is threaded.

* * * * *

UNITED STATES PATENT AND TRADEMARK OFFICE
CERTIFICATE OF CORRECTION

PATENT NO. : 5,141,774
DATED : August 25, 1992
INVENTOR(S) : Prittinen, et al.

It is certified that error appears in the above-identified patent and that said Letters Patent is hereby corrected as shown below:

On the title page:
    Item [76] please insert -- Assignee Multech, Inc. --.

Signed and Sealed this

Eighth Day of February, 1994

Attest:

BRUCE LEHMAN

Attesting Officer      Commissioner of Patents and Trademarks